(12) United States Patent
Kobyakov et al.

(10) Patent No.: US 8,751,304 B1
(45) Date of Patent: Jun. 10, 2014

(54) MONITORING CONTENT ITEM EXPANSION EVENTS ACROSS MULTIPLE CONTENT ITEM PROVIDERS

(75) Inventors: Pavel Kobyakov, Waterloo (CA); Ksenia Shubina, Vaughan (CA)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/541,843

(22) Filed: Jul. 5, 2012

(51) Int. Cl.
*G06Q 30/00* (2012.01)
*G06Q 30/02* (2012.01)

(52) U.S. Cl.
CPC ........ *G06Q 30/0242* (2013.01); *G06Q 30/0241* (2013.01)
USPC ...................................... 705/14.41; 705/14.4

(58) Field of Classification Search
USPC .................................................... 705/14.41
See application file for complete search history.

(56) References Cited

U.S. PATENT DOCUMENTS

| | | | |
|---|---|---|---|
| 6,615,251 B1 | 9/2003 | Klug | |
| 6,973,436 B1 | 12/2005 | Shkedi | |
| 8,237,937 B2 | 8/2012 | Sugiyama | |
| 8,578,057 B2 | 11/2013 | Omar | |
| 2002/0042786 A1 | 4/2002 | Scarborough | |
| 2002/0046199 A1 | 4/2002 | Scarborough | |
| 2002/0152305 A1 | 10/2002 | Jackson | |
| 2007/0299857 A1 | 12/2007 | Gwozdz et al. | |
| 2009/0299862 A1 | 12/2009 | Fan et al. | |
| 2010/0313129 A1 | 12/2010 | Hyman | |
| 2011/0055685 A1 | 3/2011 | Jaquish et al. | |
| 2011/0153435 A1* | 6/2011 | Pisaris-Henderson | 705/14.73 |
| 2011/0161990 A1 | 6/2011 | Smith et al. | |
| 2012/0101907 A1 | 4/2012 | Dodda | |

FOREIGN PATENT DOCUMENTS

WO WO0019332 A9 10/2001

OTHER PUBLICATIONS

Gilbert, David, "Set IFRAME height based on size of remotely loaded content", solidgone Blog, Mar. 13, 2010, XP055066250, Retrieved from the Internet: URL:http://solidgone.org/Set-IFRAME-height-based-on-size-of-remotely-loaded-content [retrieved on Jun. 11, 2013], abstract, 10 pages.
How do iframe busters for expandable ads work?; javascript—How do iframe busters for expandable ads work?—Stack Overflow; http://stackoverflow.com/questions/5553469/how-do-iframe-busters-for-expandable-ads-work; Aug. 15, 2012; 3 pages.
Introducing expandable ads on AdSense sites—Inside AdSense; Inside AdSense Blog; http://adsense.blogspot.com/2009/03/introducing-expandable-ads-on-adsense.html; Aug. 14, 2012; Mar. 4, 2009; 8 pages.
Macro overview; dfp DoubleClick for Publishers; http://support.google.com/dfp_premium/bin/answer.py?hl=en&answer=1242718; Aug. 14, 2012; 7 pages.
Expanding Options in Expandable Ads; Jun. 4, 2009; Wegert, Tessa; ClickZ/Marketing News & Expert Advise; http://www.clickz.com/clickz/column/1699404/expanding-options-expandable-ads; Aug. 15, 2012; 3 pages.
"Peters, 'Iframe loading techniques and performance', aaronpeters.nl, Dec. 20, 2010, on line at aaronpeters.nl/blog/iframeloading-techniques-performance?%3E", 11 pages.

* cited by examiner

*Primary Examiner* — John G Weiss
*Assistant Examiner* — Scott C Anderson
(74) *Attorney, Agent, or Firm* — Fish & Richardson P.C.

(57) ABSTRACT

This specification describes methods, systems, and apparatus, including computer programs encoded on a computer-readable storage device, for determining expansion rates for events related to expandable content items.

15 Claims, 6 Drawing Sheets

MONITORING CONTENT ITEM EXPANSION EVENTS ACROSS MULTIPLE CONTENT ITEM PROVIDERS

BACKGROUND

This specification relates to information presentation.

Sponsored content (e.g. advertisements, deals or special offers) can be provided over the Internet to various user devices. For example, a web page can include slots in which sponsored content can be presented. These slots can be defined in the web page or defined for presentation with a web page, for example, along with search results or other content. Sponsored content can also be delivered through dedicated web portals or applications executing on the user devices.

Some content items are expandable. For example, a content item can be initially presented in an unexpanded form as a 728×90 pixel graphical item. When a user selects or interacts with this content item, an expanded view of 728×270 pixels can be presented. According, a metric of interest to a content item sponsor (e.g., an advertiser) is an expansion rate, which is a ratio of a number of times users triggered an expansion of the content item to the total number of content item impressions.

In the context of an exchange, such as an advertising exchange, content items are provided by vendors that handle the placement of advertisements for advertisers. Often a single advertiser will use multiple vendors. Each vendor, however, only reports metrics of interest, such as expansion rates, for the respective content items it serves. Thus, an advertiser must manually aggregate across all vendors it uses when evaluating expansion rates across all vendors.

SUMMARY

In general, one aspect of the subject matter described in this specification can be embodied in methods that include the actions of: for each of a plurality of content item requests for a content item: receiving data specifying a content item selected to fulfill the content item request, the data including a reporting macro that corresponds to an expansion event for which the content item is to expand to an expanded viewing state, and the content item being identified by a content item identifier, determining an impression identifier that uniquely identifies an impression for which the content item was selected, generating a reporting instruction that causes a user device to transmit a reporting message to the data processing apparatus in response to the occurrence of the expansion event corresponding to the reporting macro, substituting the reporting macro in the data specifying a content item with the reporting instruction, and sending the data specifying a content item to a user device that generated the content item request. Other embodiments of this aspect include corresponding systems, apparatus, and computer program products.

Particular embodiments of the subject matter described in this specification can be implemented so as to realize one or more of the following advantages. The content item management system can receive all reporting messages for all content items provided by all vendors, and thus can provide aggregates statistics for content items served by all vendors. This simplifies the reporting process for advertisers. Furthermore, the content item management system can also redirect reporting messages for content items served by a specific vendor to the specific vendor, and thus the reporting process of the content item management system does not impact the respective reporting processes of each respective vendor. Furthermore, the respective reporting metrics for each vendor can be provided to the advertiser by the content item management system, which facilitates and "at a glance" relative performance evaluation of the respective eventers.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Overview

The subject matter of this application provides the consolidated reporting of content item expansion events for content items provided by different parties for content sponsors. In the case of advertisements served over an exchange, a content sponsor is typically an advertiser that uses one or more vendors, each of which places advertisements for advertisers through an exchange. Each vendor provides technology for creating and serving the advertisements. However, each vendor typically provides reporting data for only the content items it serves, and does not provide reporting data for content items served by other vendors.

A content item management system, such as an advertising exchange in the case of advertisements, stores data for generating reporting instructions to be served with content items. The reporting instructions are used to send reporting data for a particular expansion event to a particular recipient, such as a server of the content item management system, to facilitate consolidated reporting.

When a particular content item is selected to be served in response to a request for a content item, the content item management system generates an impression identifier for the impression of the content item. When content item tag for the content item includes a reporting macro, the content item management system also generates a reporting instruction that will cause a user device that receives the content item for the impression to transmit a reporting message in response to the occurrence of the expansion event corresponding to the reporting macro. In some implementations, the reporting instruction is substituted for the reporting macro at serving time.

In some implementations, the reporting instruction is an event-specific URL with the impression identifier included as an attached query parameter. The content item identifier can, in some implementations, also be included as a query parameter, along with other optional information. When the expansion event that corresponds to the event-specific URL occurs, the client device issues a request for the event-specific URL. The request is sent to a host of the URL (which is, in some implementations, a server under control of the content item management system), and the requests are logged. The request may, in some implementations, be redirected to a vendor that provided the content item to support vendor-specific reporting.

Accordingly, an advertiser may access the content item management system to view consolidated reports relating to expansion events for all content items served by the content item management system. Such events may include expansions for which the content item expands to an expanded viewing state, expansion rates of the expandable advertisements, and expansion failures.

These features and other features are described in more detail below.

Example Environment

Figure 1:
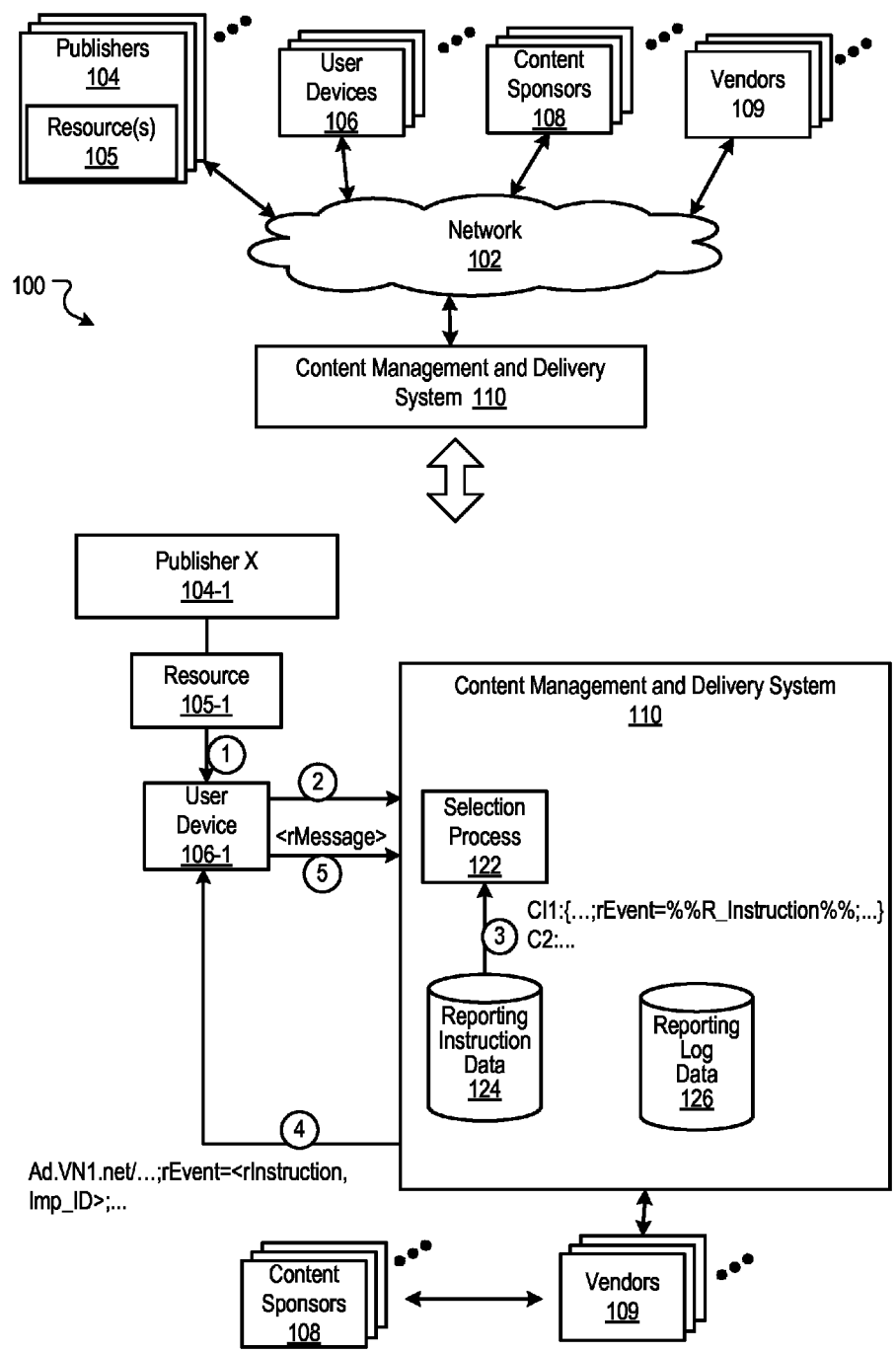
FIG. 1 is a block diagram of an example environment for delivering content.

FIG. 1 is a block diagram of an example environment 100 for delivering content. The example environment 100 includes a content management and delivery system 110 for selecting and providing content to user devices. The example environment 100 includes a network 102, such as wide area network (WAN), the Internet, or a combination thereof. The network 102 connects publisher 104, user devices 106, content sponsors 108 (e.g., advertisers that use vendors to serve advertisements), vendors 109, and the content management and delivery system 110. The example environment 100 may include many thousands of publishers 104, user devices 106, content sponsors 108.

A publisher 104 typically manages a website that includes one or more resources 105 associated with a domain name and hosted by one or more servers. An example website is a collection of web pages formatted in hypertext markup language (HTML) that can contain text, images, multimedia content, and programming elements, such as scripts. Each publisher 104 is an entity that controls, manages and/or owns the website.

A resource 105 can be any data that can be provided over the network 102. A resource 105 can be identified by a resource address that is associated with the resource 105. Resources include HTML pages, word processing documents, portable document format (PDF) documents, images, video, and news feed sources, to name only a few. The resources can include content, such as words, phrases, images, video and sounds, that may include embedded information (such as meta-information hyperlinks) and/or embedded instructions (such as JavaScript scripts). In some implementations, the resources 105 can include sponsored content provided by the content sponsors 108 and that can be rendered in specific locations in the resource. For example, the resources 105 can include an advertisement, a deal or a special offer sponsored by a content sponsor 108.

A user device 106 is an electronic device that is under control of a user and is capable of requesting and receiving resources over the network 102. Example user devices 106 include personal computers, televisions with one or more processors embedded therein or coupled thereto, set top boxes, mobile communication devices (e.g., smartphones), tablet computers, e-readers, laptop computers, personal digital assistants (PDA), and other devices that can send and receive data over the network 102. A user device 106 typically includes one or more user applications, such as a web browser, to facilitate the sending and receiving of data over the network 102.

A user device 106 can request resources 105 from a publisher 104. In turn, data representing the resource 105 can be provided to the user device 106 for presentation by the user device 106. The data representing the resource 105 can also include data specifying a portion of the resource or a portion of a user display, such as a presentation location of a pop-up window or a slot of a third-party content site or web page, in which content can be presented. These specified portions of the resource or user display are referred to as slots (e.g., content item slots, or, in the case of advertisement content items, advertisement slots).

When a resource 105 is requested by a user device 106 and the resource includes a content item slot in which a content item of a sponsor is to be rendered, the content management system 110 receives a request for a content item. The request for the content item can include characteristics of the slots that are defined for the requested resource.

The content management and delivery system 110 can select from the eligible content items that are to be provided to the user device 106 based at least in part, for example, on results of an auction (or by some other content item selection process). For example, for the eligible content items, the content management and delivery system 110 can receive offers from content sponsors 108 and allocate or prioritize delivery of the content items, based at least in part on the received offers (e.g., based on the highest bidders at the conclusion of the auction or based on other criteria, such as those related to satisfying open reservations).

For situations in which the systems discussed here collect personal information about users, the users may be provided with an opportunity to opt in/out of programs or features that may collect personal information (e.g., information about a user's social network, social actions or activities, profession, a user's preferences, or a user's current location). In addition, certain data may be anonymized in one or more ways before it is stored or used, so that personally identifiable information is removed. For example, a user's identity may be anonymized so that no personally identifiable information can be determined for the user, or a user's geographic location may be generalized where location information is obtained (such as to a city, ZIP code, or state level), so that a particular location of a user cannot be determined. In some implementations, users can opt out of being characterized or targeted for content, including advertisements, based on the interest profiles for which they may be characterized.

Figure 2A:
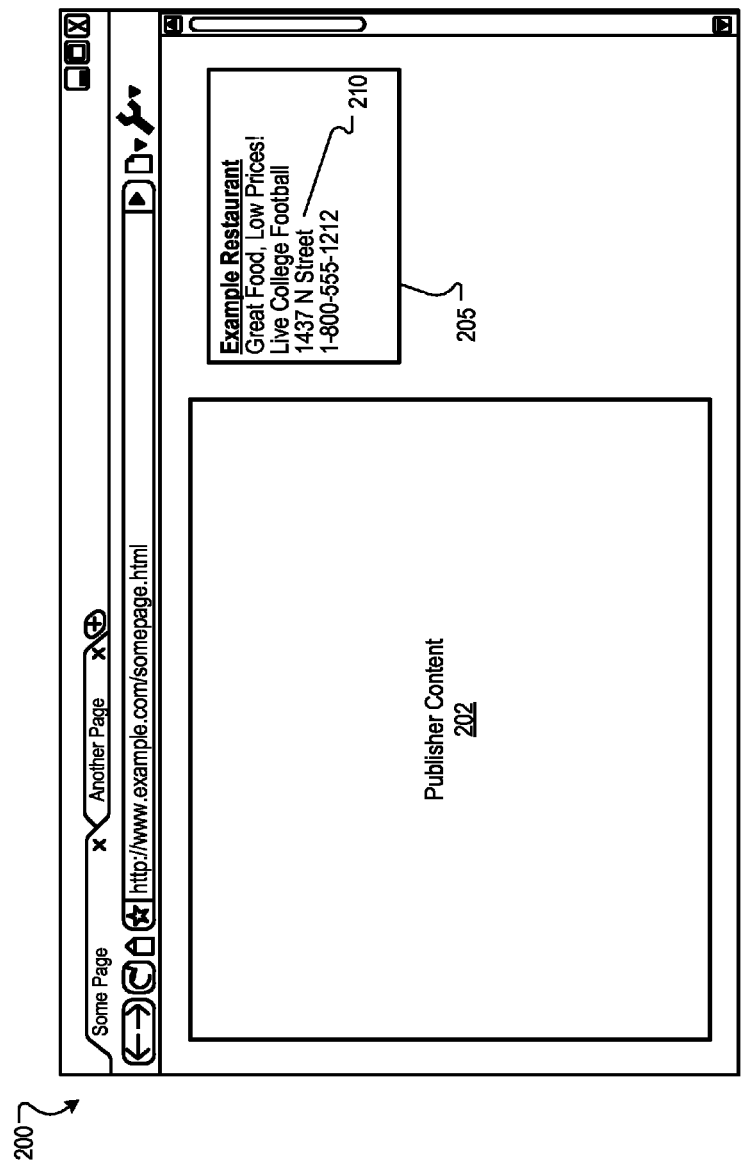
FIG. 2A depicts a browser displaying a sponsored content item.

FIG. 2A shows an example user interface 200 in which content (such as sponsored content or requested content, or both) is provided to a user device 106. For example, the resource can include specific publisher content 202 that is authored by the publisher. Additionally, resource includes a content item slot 205 in which a content item from a third party can be rendered. The content management and delivery system 110 can provide the third-party content item (e.g., advertisements, etc.) from a pool of available content items.

In some implementations, the one or more content items 210 that are selected can be selected by conducting an auction. The content items that are eligible to participate in the auction can be selected by various targeting criteria, such as interest profiles, the relevance of content items to the publisher content 202, to a time of the day, geographical location, keywords, to name a few examples.

Figure 2B:
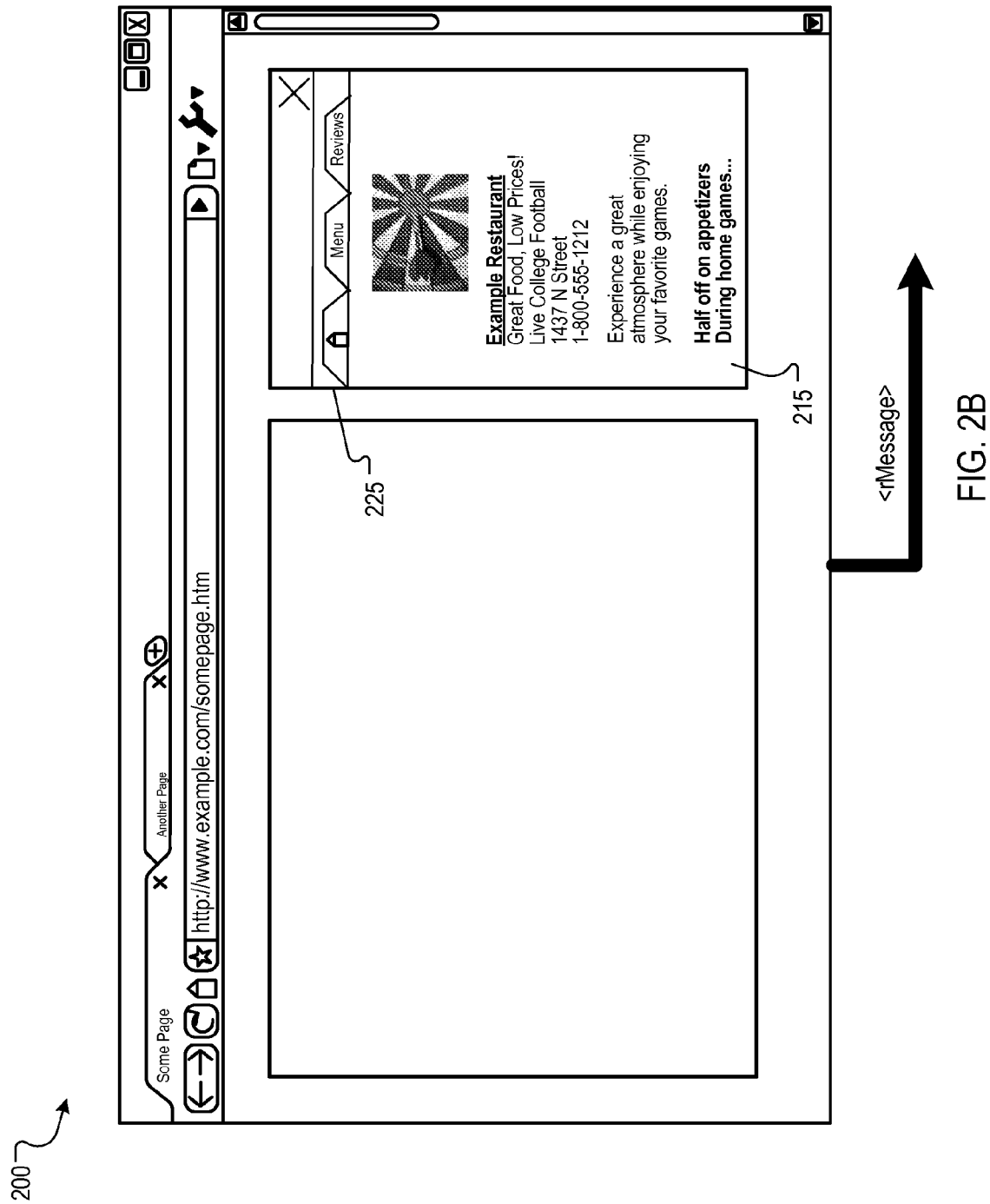
FIG. 2B depicts a browser displaying an expanded version of the sponsored content item.

In the case of expandable content items, an unexpanded version of the content item is initially rendered in the content item slot 205. When a user interacts with the content item 210 or with a trigger mechanism associated with the content item 210, the content item can be rendered in an expanded version. For example an expanded version 215 of the content item 210 is shown in the example of FIG. 2B. The expanded version 215 displays additional information. The expanded version 215 can include additional content, for example, images, larger text, audio, video, or web-based content. In one example, the content item 210 is presented first as an advertisement in textual format while enabling the user to expand the advertisement into a menu-driven, graphical advertisement in the expanded version 215. In some implementations, the action taken by the user to initiate launching the expanded version 215 can include selecting an expansion icon, selecting a marker on the side, below or above the content item, selecting or hovering a pointer over a particular portion of the content item, or, another form of user initiated and controlled action. The expanded content item 215 can also include a marker that the user can click or otherwise select such that the expanded content item 215 is replaced by the unexpanded content item 210.

As indicated by the message transmission of <rMessage>, the browser application on the client device transmits a reporting message that reports an expansion of the advertisement. The instructions that are used to generate the reporting message and the processing of received reporting messages are described in more detail below.

Content Item Expansion Event Reporting Instructions

Figure 3:
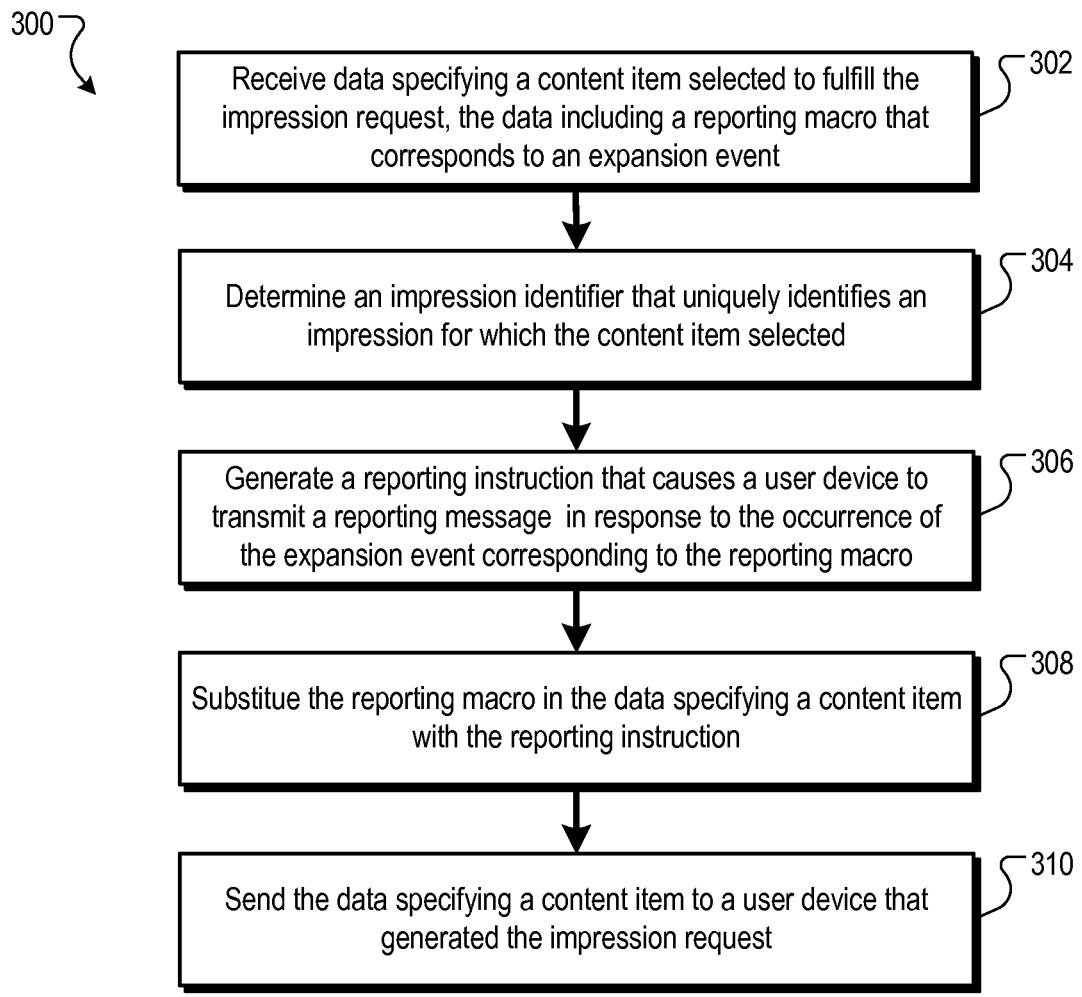
FIG. 3 is a flow diagram of an example process for modifying a content item tag with a reporting instruction based on a reporting macro.

The content management system 110 facilitates the consolidated monitoring of content item events for content item served by multiple vendors 109 by modifying content item data that include reporting macros. A macro is a sequence of characters that is mapped to a replacement input sequence of characters. FIG. 3 is a flow diagram 300 of an example process for modifying a content item tag with a reporting instruction based on a reporting macro, and is described with reference to FIG. 1.

A user device, such as the user device 106-1, requests a resource from a publisher, such as the resource 105-1 from the publisher 104-1, and the publisher provides the resource, as indicated by data flow element 1 in FIG. 1. The user device 106-1 processes the instructions of the resource 105-1, which causes the user device 106-1 to perform rendering actions and additional actions, such as processing a content item request and sending the request to the content item management system 110, as indicated by data flow element 2.

At the content item management system 110, a data processing apparatus, such as one or more computers, identifies content items that are eligible to fulfill the request, as indicated by content items CI1, CI2..., and, by use of a selection process 122, selects one (or more) of the content items to fulfill the request. For example, an auction may be conducted, and the content item with the highest auction score is selected. Here, assume that the content item CI1 is selected.

The content item manage system 110 then begins the process 300 by receiving data specifying the content item selected to fulfill the content item request (302). For example, in the case of an advertisement, the data is an advertising tag that includes a reporting macro that corresponds to an expansion event, such as:

<iframe width="0" height="0">
src="http://Ad.exampleAdExchange.net/adi/Nxxx/...
  rEvent=%%R_Instruction%%">
</iframe>

The rEvent term identifies a predefined event to be monitored, and the %%R_Instruction%% term is a reporting macro that corresponds to the event.

The content item management system 110 then determines an impression identifier that uniquely identifies an impression for which the content item was selected (304). Each time a content item is selected, it will be provided for an impression at the user device 106-1. The impression is tracked by a unique impression identifier.

The content item management system 110 then generates a reporting instruction that, when executed by the user device 106-1, causes the user device to transmit a reporting message in response to the occurrence of the event corresponding to the reporting macro (306). For example, the reporting instruction that is generated may be a resource locator that corresponds to the event and the impression identifier is appended to the resource locator as a query parameter. To illustrate, assume that the reporting event is an expansion event for an expandable content item, and the event occurs when the expandable content item is expanded. For expansion events, the following URL may be used to log occurrences of the event: AdExpansion.exampleAdExchange.net. Accordingly, for a particular impression identified by the impression identifier 123456, the reporting instruction may be:
AdExpansion.exampleAdExchange.net/exp?id=123456

The instruction is generally depicted in FIG. 1 as <rInstruction, Imp_ID>.

More than one expansion event may be monitored. For example, assume that two events are monitored—expansions and expansion failures. An association of reporting instructions and events is stored in reporting instruction data 124 and is used to generate reporting instructions for each event. To illustrate, for the expansion event, the URL "AdExpansion.exampleAdExchange.net" is used. For another event, such as an expansion failure, another URL, such as "AdExpansionFail.exampleAdExchange.net" is used. The particular reporting URL may be identified by the corresponding event tag, e.g., ExpandEvent=%%RExpand_Instruction%%; and
ExpandFail=%%RExpandFail_Instruction%%"

Expansions failures may occur, for example, when a user device is unable to access supporting instructions that facilitate expansion of the content item. Such supporting instructions may be provided in a "publisher side file" (PSF) for a publisher host. The PSF file stores instructions that are used to ensure proper rendering, expansion and contraction of the expandable content item. If the file is not stored by the publisher, or is otherwise inaccessible, then the expandable content item may not expand. In such situations, the content item at the user device does not change state, or, alternatively, a default content item is served. The reporting log data 126 are processed to determine whether a reported expansion event has a corresponding failure record. From these records, both expansion rates and expansion failure rates can be determined. To illustrate, assume for 1,000 impressions of a particular content item, there are 500 expansion events reported, and 5 failures reported. The expansion rate is thus 50%, and the expansion failure rate is 1%.

In a variation of this implementation, additional instructions, such as script instructions, can be invoked to determine whether the expansion is successful or fails. Query parameters are then appended to the reporting instructions. The query parameters indicate one of a successful expansion or a failure, depending on the result.

In addition to expansion failures, other expansion events, such as expansion directions, can also be monitored, either by a corresponding URL or by a query parameter.

The content item management system 110 substitutes the reporting macro in the data specifying a content item with the reporting instruction (308). Thus, the content item manage ment system 110 modifies the advertising tag described above to generate the following tag:

```
<iframe width="0" height="0"
 src="http://Ad.exampleAdExchange.net/adi/Nxxx/...
    rEvent=AdExpansion.exampleAdExchange.net/ex-
    p?id=123456">
</iframe>
```

The data is then provided to the user device that generated the content item request (310), as indicated by the data flow element 4.

The reporting instructions are shown in the context of an iframe tag. However, other tags may also be used, depending on the particular implementations used to display content items at the user device.

Processing Content Item Expansion Event Reporting Messages

At the user device 106-1, a process, such as a browser process, in response to the occurrence of the specified event rEvent, generates a reporting message <rMessage>, as indicated by the data flow element 5. The reporting records are then provided as specified by the instruction for recording and processing to determine performance metrics related to the monitored events.

Figure 4:
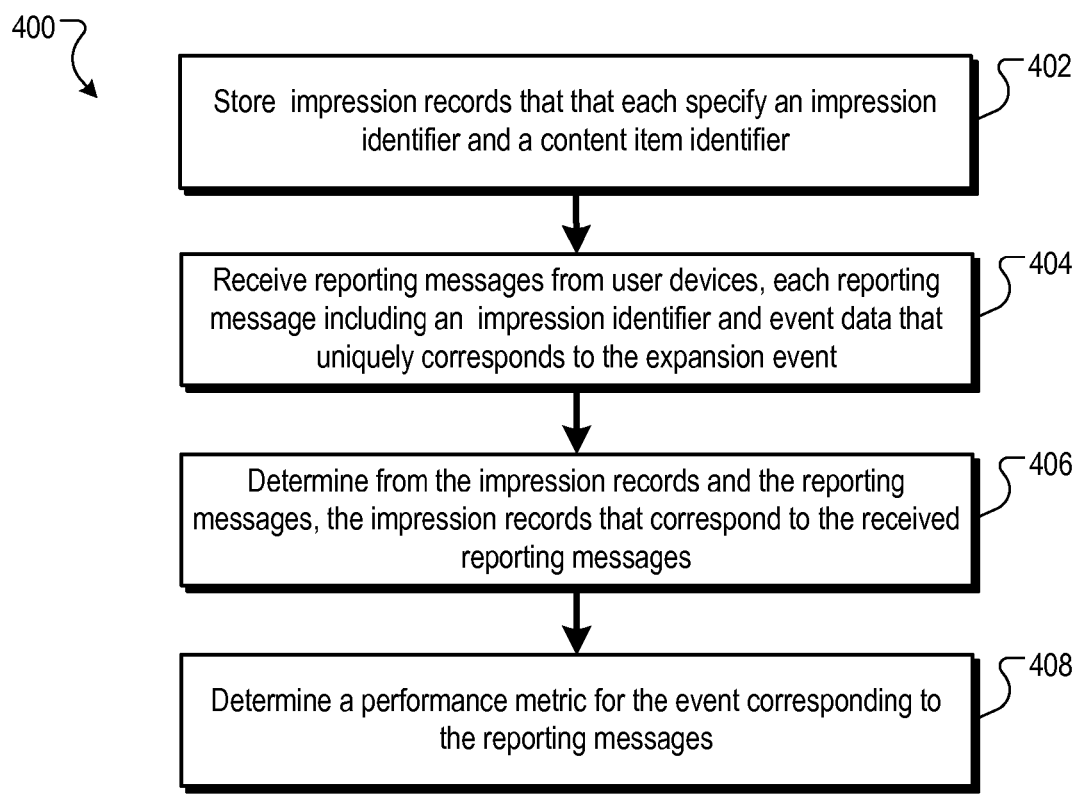
FIG. 4 is a flow diagram of an example process for determining a performance metric from messages received from execution of the reporting instructions.

FIG. 4 is a flow diagram of an example process 400 for determining a performance metric from messages received from execution of the reporting instructions, and is describe with reference to FIG. 1.

The content item management system 110 stores an impression record that specifies the impression identifier and the content item identifier (402). For example, the reporting log data 126 is used to store an impression record and the content item identifier. Thus, a total number of impressions for each content item may be determined from the reporting log data 126.

The content item management system 110 receives reporting messages from the user devices 106 (404). For each user device at which the expansion event occurs, a reporting message is generated. For example, if the event is an expansion event for an expandable advertisement, the reporting message is only generated if the expandable advertisement is expanded.

Each reporting message includes the impression identifier and event data that uniquely corresponds to the expansion event. In the case of reporting URLs, the event data is the URL that corresponds to the event. For example, assume that two events are monitored—expansion events and expansion failures. When an expansion event occurs at a user device, the user device will send a reporting message in the form of an HTTP request with the impression identifier as a query parameter to the URL associated with expansion event. Likewise, when an expansion failure occurs at a user device, the user device will send a reporting message in the form of an HTTP request with the impression identifier as a query parameter to the URL associated with an expansion failure event.

The content item management system 110 determines from the impression records and the reporting messages the impression records that correspond to the received reporting messages (406). Both the impression records and the reporting records include the impression identifier. The content item management system 110 can identify impression/reporting record pairs that are each a pair of an impression record and a reporting record that both include the same impression identifier. Because it is unlikely that every impression will result in an event, i.e., some advertisements will not be expanded, a reporting record may not be received for each impression record. Thus, not every impression record will be paired with a reporting record.

The content item management system 110 determines a performance metric for the event corresponding to the reporting message (408). For example, assuming the metric is an event rate metric for an event, the event rate is based on a cardinality of particular impression records that include a particular content item identifier and a cardinality reporting messages include impression identifiers that match the impression identifiers of the particular impression records. To illustrate, assume a particular advertisement is identified by an advertisement identifier AD_ID. Each impression record that includes the AD_ID is a particular impression record that is counted in the cardinality for impression records. Each of the particular impression records is processed to determine whether there is a corresponding reporting record that includes the same impression identifier as the impression record. The identified reporting records are then counted in the cardinality of the reporting messages. To further illustrate, assume a particular advertisement has 1,000 impression records. Those 1,000 impression records include 1,000 impression identifiers, and from those 1,000 impression identifiers, there are 42 reporting records for an expansion event identified. Thus, the expansion rate for the particular advertisement is 4.2% (42/1,000).

Additional Reporting Features

The performance metrics are described in the context of a particular content item. However, a metric may be determined for a group of content items, such as an expansion rate for a group of advertisements that belong to the same advertisement group (i.e., a predefined association of advertisements).

Similarly, the metrics are derived from consolidated reporting records from multiple vendors. For example, a particular advertiser may use multiple vendors to serve the same advertisement or support the same advertising campaign. In some implementations, the content item management system 110 can define reporting URLs that are specific to both vendors and events. For example, for expansion events for advertisements provided by two vendors, vendor 1 and vendor 2, the respective URLs may be used:

AdV1Expand.exampleAdExchange.net for vendor 1; and
AdV2Expand.exampleAdExchange.net for vendor 2.

The content item management system 110 can aggregate reporting records for each vendor. Accordingly, the content item management system 110 can thus provide the advertiser with a metric that considers all reporting metrics across all vendors, and vendor-specific metrics for each vendor. For example, the expansion rate for all advertisements placed for a particular advertisement group may be provided, and the advertiser can "drill down" to each vendor that provided advertisements that belong to the advertisement group to determine the performance of the particular advertisements provided by the vendor.

Additionally, the reporting instruction can be further configured so that the content item management system redirects the reporting message to the particular vendor. For example, the content item server 110 can perform a proxy function by which it redirects the reporting URL request generated for a particular advertisement provided by a particular vendor to the particular vendor. The vendors may then perform their own respective data processing operations on the received reporting messages. Alternatively, the reporting instruction can be further configured so that the reporting messages are sent to the vendor first for processing, and the vendor system then redirects the reporting message to the content item management system.

Additional Implementation Details

Figure 5:
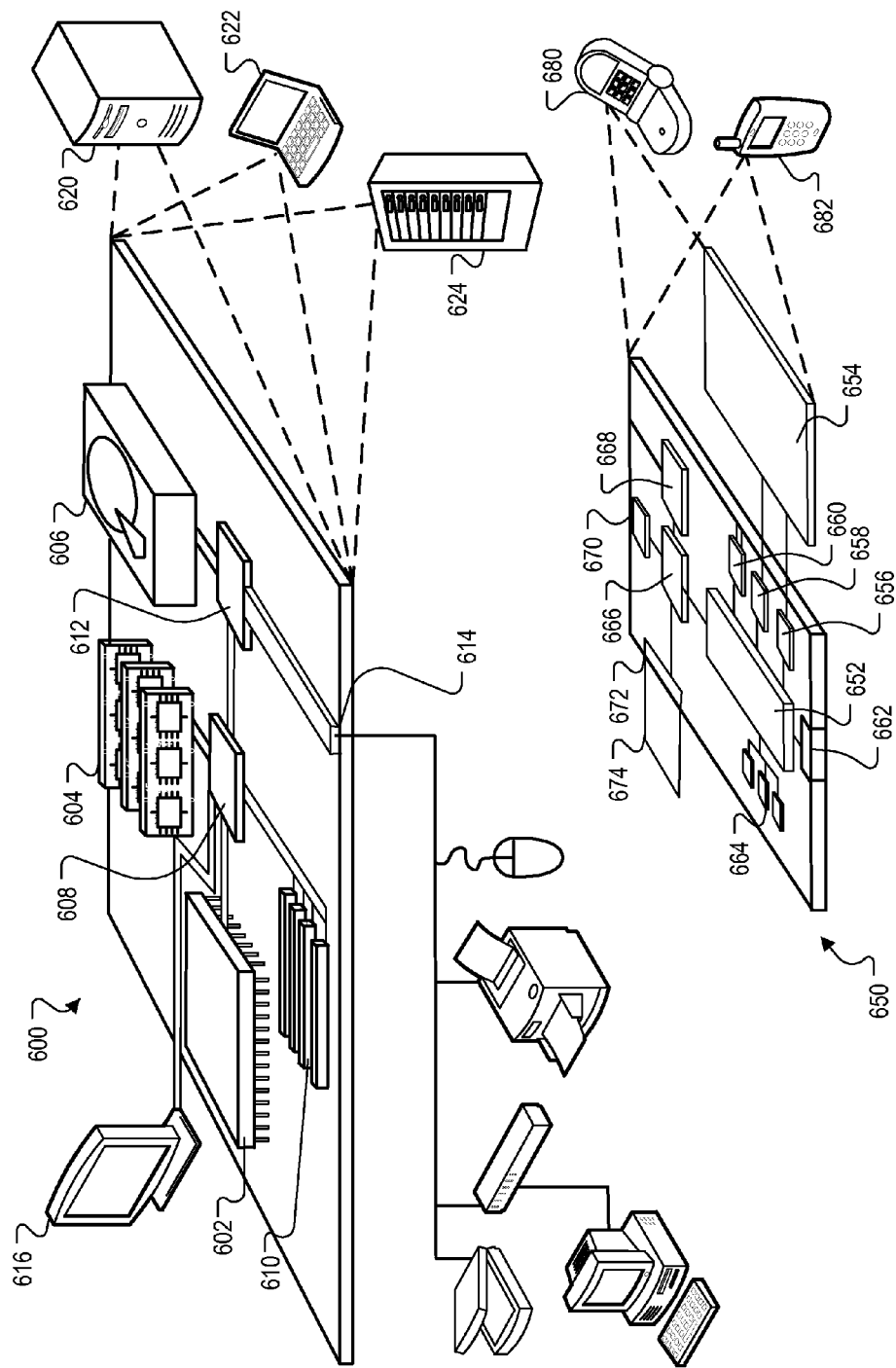
FIG. 5 is a block diagram of an example computer system that can be used to implement the methods, systems and processes described in this disclosure.

FIG. 5 is a block diagram of computing devices 600, 650 that may be used to implement the systems and methods described in this document, as either a client or as a server or plurality of servers. Computing device 600 is intended to represent various forms of digital computers, such as laptops, desktops, workstations, personal digital assistants, servers, blade servers, mainframes, and other appropriate computers. Computing device 600 is further intended to represent various typically non-mobile devices, such as televisions or other electronic devices with one or more processers embedded therein or attached thereto. Computing device 650 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 600 includes a processor 602, memory 604, a storage device 606, a high-speed interface 608 connecting to memory 604 and high-speed expansion ports 610, and a low speed interface 612 connecting to low speed bus 614 and storage device 606. Each of the components 602, 604, 606, 608, 610, and 612, are interconnected using various busses, and may be mounted on a common motherboard or in other manners as appropriate. The processor 602 can process instructions for execution within the computing device 600, including instructions stored in the memory 604 or on the storage device 606 to display graphical information for a GUI on an external input/output device, such as display 616 coupled to high speed interface 608. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 604 stores information within the computing device 600. In one implementation, the memory 604 is a computer-readable medium. In one implementation, the memory 604 is a volatile memory unit or units. In another implementation, the memory 604 is a non-volatile memory unit or units.

The storage device 606 is capable of providing mass storage for the computing device 600. In one implementation, the storage device 606 is a computer-readable medium. In various different implementations, the storage device 606 may be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 604, the storage device 606, or memory on processor 602.

The high speed controller 608 manages bandwidth-intensive operations for the computing device 600, while the low speed controller 612 manages lower bandwidth-intensive operations. Such allocation of duties is exemplary only. In one implementation, the high-speed controller 608 is coupled to memory 604, display 616 (e.g., through a graphics processor or accelerator), and to high-speed expansion ports 610, which may accept various expansion cards (not shown). In the implementation, low-speed controller 612 is coupled to storage device 606 and low-speed expansion port 614. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. It may also be implemented as part of a rack server system 624. In addition, it may be implemented in a personal computer such as a laptop computer 622. Alternatively, components from computing device 600 may be combined with other components in a mobile device (not shown), such as device 650. Each of such devices may contain one or more of computing device 600, 650, and an entire system may be made up of multiple computing devices 600, 650 communicating with each other.

Computing device 650 includes a processor 652, memory 664, an input/output device such as a display 654, a communication interface 666, and a transceiver 668, among other components. The device 650 may also be provided with a storage device, such as a microdrive or other device, to provide additional storage. Each of the components 650, 652, 664, 654, 666, and 668, are interconnected using various buses, and several of the components may be mounted on a common motherboard or in other manners as appropriate.

The processor 652 can process instructions for execution within the computing device 650, including instructions stored in the memory 664. The processor may also include separate analog and digital processors. The processor may provide, for example, for coordination of the other components of the device 650, such as control of user interfaces, applications run by device 650, and wireless communication by device 650.

Processor 652 may communicate with a user through control interface 658 and display interface 656 coupled to a display 654. The display 654 may be, for example, a TFT LCD display or an OLED display, or other appropriate display technology. The display interface 656 may comprise appropriate circuitry for driving the display 654 to present graphical and other information to a user. The control interface 658 may receive commands from a user and convert them for submission to the processor 652. In addition, an external interface 662 may be provided in communication with processor 652, so as to enable near area communication of device 650 with other devices. External interface 662 may provide, for example, for wired communication (e.g., via a docking procedure) or for wireless communication (e.g., via Bluetooth or other such technologies).

The memory 664 stores information within the computing device 650. In one implementation, the memory 664 is a computer-readable medium. In one implementation, the memory 664 is a volatile memory unit or units. In another implementation, the memory 664 is a non-volatile memory unit or units. Expansion memory 674 may also be provided and connected to device 650 through expansion interface 672, which may include, for example, a SIMM card interface. Such expansion memory 674 may provide extra storage space for device 650, or may also store applications or other information for device 650. Specifically, expansion memory 674 may include instructions to carry out or supplement the processes described above, and may include secure information also. Thus, for example, expansion memory 674 may be provide as a security module for device 650, and may be programmed with instructions that permit secure use of device 650. In addition, secure applications may be provided via the SIMM cards, along with additional information, such as placing identifying information on the SIMM card in a non-hackable manner.

The memory may include for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 664, expansion memory 674, or memory on processor 652.

Device 650 may communicate wirelessly through communication interface 666, which may include digital signal processing circuitry where necessary. Communication interface 666 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 668. In addition, short-range communication may occur, such as using a Bluetooth, WiFi, or other such transceiver (not shown). In addition, GPS receiver module 670 may provide additional wireless data to device 650, which may be used as appropriate by applications running on device 650.

Device 650 may also communicate audibly using audio codec 660, which may receive spoken information from a user and convert it to usable digital information. Audio codec 660 may likewise generate audible sound for a user, such as through a speaker, e.g., in a handset of device 650. Such sound may include sound from voice telephone calls, may include recorded sound (e.g., voice messages, music files, etc.) and may also include sound generated by applications operating on device 650.

The computing device 650 may be implemented in a number of different forms, as shown in the figure. For example, it may be implemented as a cellular telephone 680. It may also be implemented as part of a smartphone 682, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor. A machine-readable medium or a computer-readable medium does not include a transitory signal.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method implemented in an advertising exchange, comprising:
for each of a plurality of content item requests for a content item received at an advertising exchange:
receiving, by the advertising exchange, data specifying a content item selected to fulfill the content item request, the data including a reporting macro that corresponds to an expansion event for which the content item is to expand to an expanded viewing state, the macro being a sequence of characters that is mapped to a replacement sequence of characters, and the content item being identified by a content item identifier;
determining, by the advertising exchange, an impression identifier that uniquely identifies an impression for which the content item was selected;
generating, by the advertising exchange, a reporting instruction executable by a user device and that causes the user device to transmit a reporting message to the advertising exchange in response to the occurrence of the expansion event corresponding to the reporting macro;
substituting, by the advertising exchange, the reporting macro in the data specifying a content item with the reporting instruction; and
sending, by the advertising exchange, the data specifying the content item with the reporting instruction substituted for the reporting macro to a user device that generated the content item request; and
storing an impression record that specifies the impression identifier and the content item identifier;
receiving from user devices reporting messages, each reporting message including an impression identifier and event data that uniquely corresponds to the expansion event, each reporting message generated in response to a user device executing a reporting instruction; and
determining, from the impression records and the reporting messages, the impression records that correspond to the received reporting messages;
wherein the content items are expandable advertisement served by vendors through the advertising exchange, and the reporting records received are for expandable advertisements for a plurality of vendors.

2. The method of claim 1, further comprising determining an expansion rate based on a cardinality of particular impression records that include a particular content item identifier and a cardinality of reporting messages that include impression identifiers that match the impression identifiers of the particular impression records.

3. The method of claim 1, wherein:
the reporting message further specifies an expansion failure when an expansion of the content item fails to occur for the expansion event; and
further comprising determining an expansion failure rate based on a cardinality of reporting messages that specify an expansion failure and a cardinality of reporting messages specifying an expansion event.

4. The method of claim 1, wherein the event data that uniquely corresponds to the expansion event comprises a unique resource locator that corresponds to the expansion event.

5. The method of claim 1, wherein generating a reporting instruction comprises:
generating a resource locator that corresponds to the expansion event; and
appending the impression identifier to the resource locator as a query parameter.

6. The method of claim 5, wherein generating a resource locator that corresponds to the expansion event comprises:
determining a vendor of the content item selected to fulfill the content item request, wherein the vendor is one of a plurality of vendors that provide content items to fulfill content item requests; and
selecting from a plurality of resource locators, each specific to one of the plurality of vendors, a resource locator specific to the determined vendor.

7. The method of claim 6, wherein:
receiving from user devices reporting messages comprises receiving reporting messages in which each reporting message includes the impression identifier and one of the resource locators specific to one of the vendors; and
redirecting, for each reporting message, at least a portion of the reporting message to the resource locator included in the reporting message.

8. A system, comprising:
a data processing apparatus; and
a computer memory apparatus in data communication with the data processing apparatus and storing instructions executable by the data processing apparatus and that upon such execution cause the data processing apparatus to perform operations comprising:
for each of a plurality of content item requests for a content item received at the data processing apparatus:
receiving data specifying a content item selected to fulfill the content item request, the data including a reporting macro that corresponds to an expansion event for which the content item is to expand to an expanded viewing state, the macro being a sequence of characters that is mapped to a replacement sequence of characters, and the content item being identified by a content item identifier;
determining an impression identifier that uniquely identifies an impression for which the content item was selected;
generating a reporting instruction executable by a user device and that causes the user device to transmit a reporting message to the data processing apparatus in response to the occurrence of the expansion event corresponding to the reporting macro;
substituting the reporting macro in the data specifying a content item with the reporting instruction; and
sending the data specifying the content item with the reporting instruction substituted for the reporting macro to a user device that generated the content item request; and
storing an impression record that specifies the impression identifier and the content item identifier;
receiving from user devices reporting messages, each reporting message including an impression identifier and event data that uniquely corresponds to the expansion event, each reporting message generated in response to a user device executing a reporting instruction; and determining, from the impression records and the reporting messages, the impression records that correspond to the received reporting messages;

wherein the content item are expandable advertisement served by vendors through the advertising exchange, and the reporting records received are for expandable advertisements for a plurality of vendors.

9. The system of claim 8, the operations further comprising determining an expansion rate based on a cardinality of particular impression records that include a particular content item identifier and a cardinality of reporting messages that include impression identifiers that match the impression identifiers of the particular impression records.

10. The system of claim 8, wherein:

the reporting message further specifies an expansion failure when an expansion of the content item fails to occur for the expansion event; and further comprising determining an expansion failure rate based on a cardinality of reporting messages that specify an expansion failure and a cardinality of reporting messages specifying an expansion event.

11. The system of claim 8, wherein the event data that uniquely corresponds to the expansion event comprises a unique resource locator that corresponds to the expansion event.

12. The system of claim 8, wherein generating a reporting instruction comprises:

generating a resource locator that corresponds to the expansion event; and appending the impression identifier to the resource locator as a query parameter.

13. The system of claim 12, wherein generating a resource locator that corresponds to the expansion event comprises:

determining a vendor of the content item selected to fulfill the content item request, wherein the vendor is one of a plurality of vendors that provide content items to fulfill content item requests; and selecting from a plurality of resource locators, each specific to one of the plurality of vendors, a resource locator specific to the determined vendor.

14. The system of claim 13, wherein:

receiving from user devices reporting messages comprises receiving reporting messages in which each reporting message includes the impression identifier and one of the resource locators specific to one of the vendors; and redirecting, for each reporting message, at least a portion of the reporting message to the resource locator included in the reporting message.

15. A non-transitory computer memory apparatus storing instructions executable by a data processing apparatus and that upon such execution cause the data processing apparatus to perform operations comprising:

for each of a plurality of content item requests for a content item received at the data processing apparatus:

receiving data specifying a content item selected to fulfill the content item request, the data including a reporting macro that corresponds to an expansion event for which the content item is to expand to an expanded viewing state, the macro being a sequence of characters that is mapped to a replacement sequence of characters, and the content item being identified by a content item identifier;

determining an impression identifier that uniquely identifies an impression for which the content item was selected;

generating a reporting instruction executable by a user device and that causes the user device to transmit a reporting message to the data processing apparatus in response to the occurrence of the expansion event corresponding to the reporting macro;

substituting the reporting macro in the data specifying a content item with the reporting instruction; and sending the data specifying the content item with the reporting instruction substituted for the reporting macro to a user device that generated the content item request; and storing an impression record that specifies the impression identifier and the content item identifier;

receiving from user devices reporting messages, each reporting message including an impression identifier and event data that uniquely corresponds to the expansion event, each reporting message generated in response to a user device executing a reporting instruction; and determining, from the impression records and the reporting messages, the impression records that correspond to the received reporting messages;

wherein the content item are expandable advertisement served by vendors through the advertising exchange, and the reporting records received are for expandable advertisements for a plurality of vendors.

\* \* \* \* \*

UNITED STATES PATENT AND TRADEMARK OFFICE
CERTIFICATE OF CORRECTION

PATENT NO. : 8,751,304 B1
APPLICATION NO. : 13/541843
DATED : June 10, 2014
INVENTOR(S) : Pavel Kobyakov et al.

Page 1 of 1

It is certified that error appears in the above-identified patent and that said Letters Patent is hereby corrected as shown below:

On the Title Page, item (56)

Column 2, Line 14-15 – delete "support_google" and insert -- support.google --, therefor.

Signed and Sealed this
Second Day of September, 2014

Michelle K. Lee
*Deputy Director of the United States Patent and Trademark Office*